United States Patent
Peddada et al.

(10) Patent No.: US 10,425,224 B1
(45) Date of Patent: Sep. 24, 2019

(54) IDENTITY CONFIRMATION USING PRIVATE KEYS

(71) Applicant: salesforce.com, inc., San Francisco, CA (US)

(72) Inventors: Prasad Peddada, Alameda, CA (US); Taher ElGamal, Atherton, CA (US)

(73) Assignee: salesforce.com, inc., San Francisco, CA (US)

( * ) Notice: Subject to any disclaimer, the term of this patent is extended or adjusted under 35 U.S.C. 154(b) by 218 days.

(21) Appl. No.: 15/638,853

(22) Filed: Jun. 30, 2017

(51) Int. Cl.
- *H04L 9/30* (2006.01)
- *H04L 9/08* (2006.01)
- *H04L 29/06* (2006.01)

(52) U.S. Cl.
CPC ........ *H04L 9/0825* (2013.01); *H04L 63/0478* (2013.01); *H04L 9/30* (2013.01)

(58) Field of Classification Search
CPC ...... H04L 9/30; H04L 63/0478; H04L 9/0825
USPC .......................................................... 713/171
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

OTHER PUBLICATIONS

U.S. Appl. No. 13/986,251, filed Apr. 16, 2013.

*Primary Examiner* — Jason K Gee
*Assistant Examiner* — Dereena T Cattungal
(74) *Attorney, Agent, or Firm* — Dergosits & Noah LLP; Todd A. Noah

(57) ABSTRACT

Systems and methods for identify confirmation and transaction security are described. The system transmits to a client computing system an encrypted challenge generated using a public key of an asymmetric key pair and a first partially decrypted challenge generated by applying a first private key fragment of a private key of the asymmetric key pair to the encrypted challenge. The system receives a decrypted challenge generated by applying a second private key fragment of the private key to the encrypted challenge to generate a second partially decrypted challenge, applying a third private key fragment of the private key to the encrypted challenge to generate a third partially decrypted challenge, and combining the first partially decrypted challenge, the second partially decrypted challenge and the third partially decrypted challenge to generate the decrypted challenge. The system uses the decrypted challenge for verification.

18 Claims, 14 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,263,775 B2* | 4/2019 | Setty .................... H04L 63/062 |
| 2001/0044791 A1 | 11/2001 | Richter et al. |
| 2002/0072951 A1 | 6/2002 | Lee et al. |
| 2002/0078345 A1* | 6/2002 | Sandhu ................ H04L 9/0825 |
| | | 713/155 |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0246771 A1* | 11/2005 | Hunt .................... H04L 9/3273 |
| | | 726/18 |
| 2007/0258585 A1* | 11/2007 | Sandhu .................. H04L 9/302 |
| | | 380/44 |
| 2007/0258594 A1* | 11/2007 | Sandhu ................ H04L 9/0825 |
| | | 380/277 |
| 2008/0226062 A1* | 9/2008 | Puech .................... H04L 9/085 |
| | | 380/28 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0310436 A1* | 10/2015 | Lakshmanan ......... G06Q 20/40 |
| | | 705/71 |
| 2016/0080157 A1* | 3/2016 | Lundstrom ........... H04L 63/126 |
| | | 713/176 |
| 2016/0140334 A1* | 5/2016 | Forehand ................ G06F 21/44 |
| | | 726/19 |
| 2017/0222805 A1* | 8/2017 | Telford ................ H04L 9/0822 |

* cited by examiner

US 10,425,224 B1

IDENTITY CONFIRMATION USING PRIVATE KEYS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to identity verification.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Identification of humans for online services requires providing user identification and some form of password or well-known personal information such as mother's maiden name or SSN, etc. This could lead identity theft while increasing risk for business. It is also costly to secure this information on behalf of the clients.

BRIEF SUMMARY

For some embodiments, methods for identity verification comprises transmitting, by a server computing system to a client computing system, an encrypted challenge generated using a public key of an asymmetric key pair; transmitting, by the server computing system to the client computing system, a first partially decrypted challenge generated by applying a first private key fragment of a private key of the asymmetric key pair to the encrypted challenge; receiving, by the server computing system from the client computing system, a decrypted challenge, the decrypted challenge generated by: (i) applying a second private key fragment of the private key to the encrypted challenge to generate a second partially decrypted challenge, the second private key fragment stored in the client computing system; (ii) applying a third private key fragment of the private key to the encrypted challenge to generate a third partially decrypted challenge, the third private key fragment provided by a user of the client computing system; and (iii) combining the first partially decrypted challenge, the second partially decrypted challenge and the third partially decrypted challenge to generate the decrypted challenge; and using, by the server computing system, the decrypted challenge for identity verification. Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
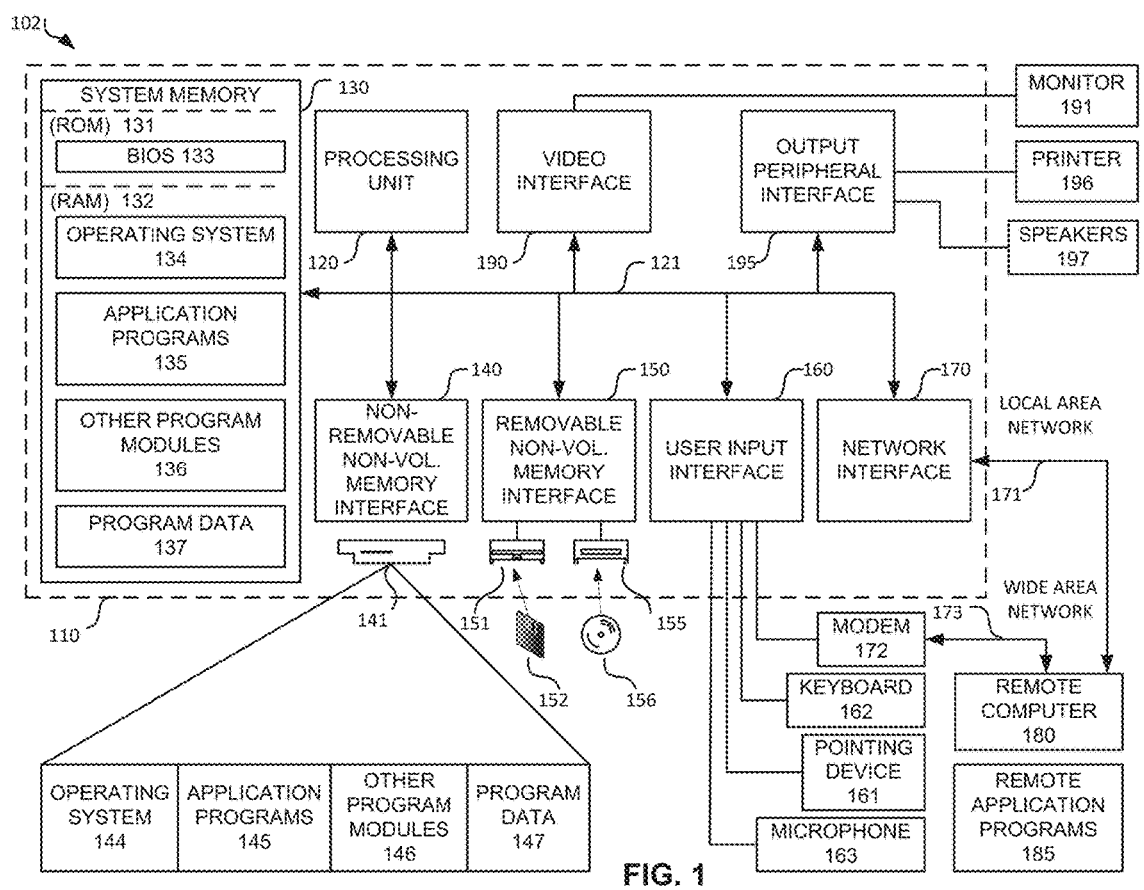
FIG. 1 shows a diagram of an example computing system that may be used with some embodiments.

Systems and methods for using private key fragments to enable identification or identity verification are disclosed. A pair of keys includes a public key and a private key. The private key may be fragmented into three private key fragments. The public key may be used to encrypt a challenge. Each of the three private key fragments may be used to partially decrypt the encrypted challenge. A decrypted challenge in its entirety or a derived token using the challenge may be used for identification of the user and type of transaction being performed.

The systems and methods will be described with reference to example embodiments. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include systems and methods for identification. The method may include transmitting, by a server computing system to a client computing system, an encrypted challenge generated using a public key of an asymmetric key pair; transmitting, by the server computing system to the client computing system, a first partially decrypted challenge generated by applying a first private key fragment of a private key of the asymmetric key pair to the encrypted challenge; receiving, by the server computing system from the client computing system, a decrypted challenge, the decrypted challenge generated by: (i) applying a second private key fragment of the private key to the encrypted challenge to generate a second partially decrypted challenge, the second private key fragment stored in the client computing system; (ii) applying a third private key fragment of the private key to the encrypted challenge to generate a third partially decrypted challenge, the third private key fragment provided by a user of the client computing system; and (iii) combining the first partially decrypted challenge, the second partially decrypted challenge and the third partially decrypted challenge to generate the decrypted challenge; and using, by the server computing system, the decrypted challenge for identity verification.

The disclosed embodiments may include an apparatus for performing identification and include a processor, and one or more stored sequences of instructions which, when executed by the processor, cause the processor to transmit an encrypted challenge generated using a public key of an asymmetric key pair; transmit a first partially decrypted challenge generated by applying a first private key fragment of a private key of the asymmetric key pair to the encrypted challenge; receiving a decrypted challenge, the decrypted challenge generated by: (i) applying a second private key fragment of the private key to the encrypted challenge to generate a second partially decrypted challenge, the second private key fragment stored in a client computing system; (ii) applying a third private key fragment of the private key to the encrypted challenge to generate a third partially decrypted challenge, the third private key fragment provided by a user of the client computing system; and (iii) combining the first partially decrypted challenge, the second partially decrypted challenge and the third partially decrypted challenge to generate the decrypted challenge; and using the decrypted challenge for identity verification.

The disclosed embodiments may include a computer program product comprising computer-readable program code to be executed by one or more processors when retrieved from a non-transitory computer-readable medium, the program code including instructions to transmit an encrypted challenge generated using a public key of an asymmetric key pair; transmit a first partially decrypted challenge generated by applying a first private key fragment of a private key of the asymmetric key pair to the encrypted challenge; receiving a decrypted challenge, the decrypted challenge generated by: (i) applying a second private key fragment of the private key to the encrypted challenge to generate a second partially decrypted challenge, the second private key fragment stored in a client computing system; (ii) applying a third private key fragment of the private key to the encrypted challenge to generate a third partially decrypted challenge, the third private key fragment provided by a user of the client computing system; and (iii) combining the first partially decrypted challenge, the second partially decrypted challenge and the third partially decrypted challenge to generate the decrypted challenge; and using the decrypted challenge for identity verification.

While one or more implementations and techniques are described with reference to an embodiment in which private key fragments may be used for identification is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is a diagram of an example computing system that may be used with some embodiments of the present invention. The computing system 102 may be used by a user to for identity verification based on private key fragments. For some embodiments, the server computing system may be associated with a multi-tenant database environment. For example, the multi-tenant database environment may be associated with the services provided by Salesforce.com®.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer program product. Computer program product can be any available media that can be accessed by computing system 102 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
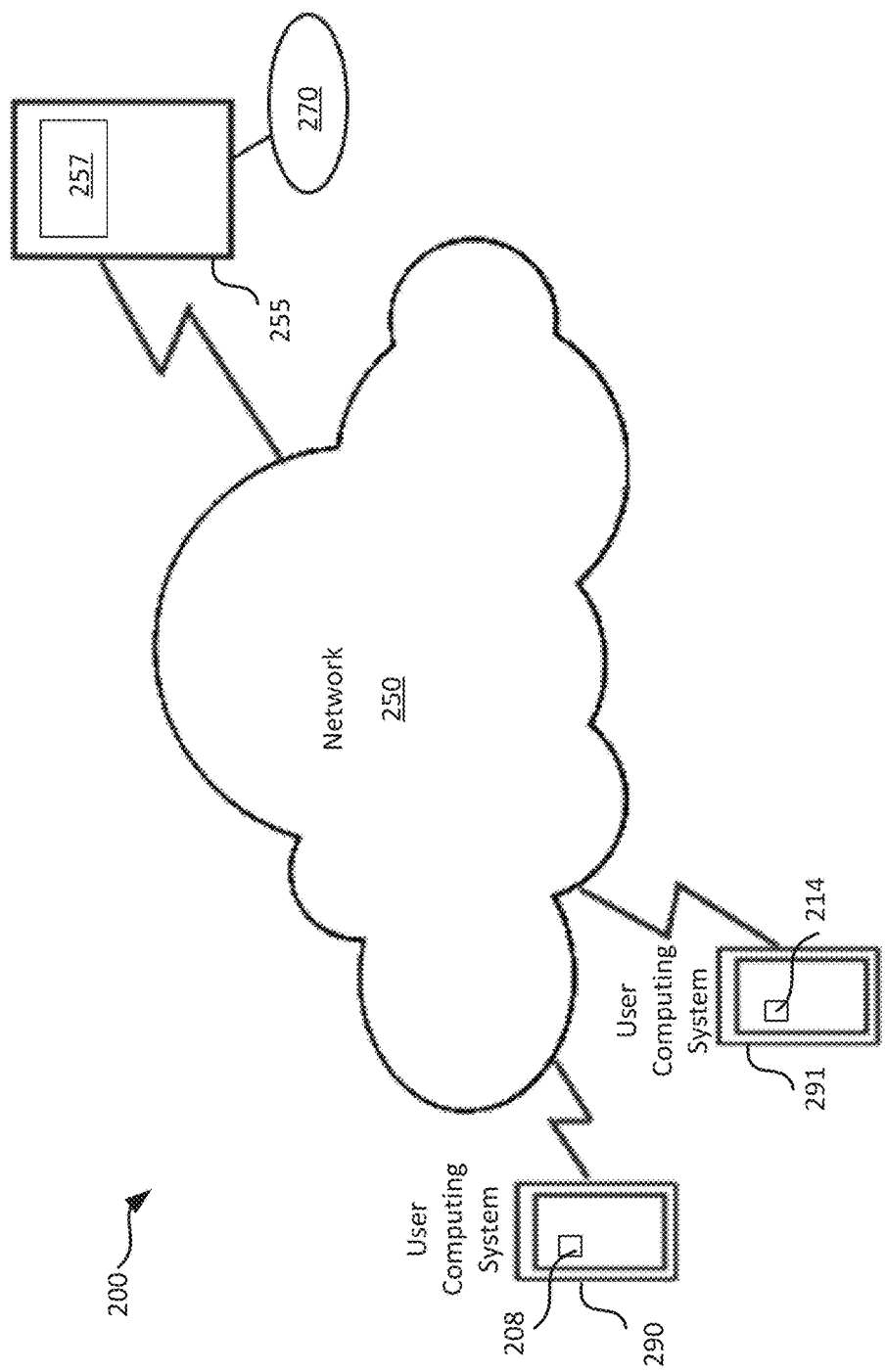
FIG. 2 shows a diagram of an example network environment that may be used with some embodiments.

FIG. 2 shows a diagram of an example network environment that may be used with some embodiments of the present invention. Network environment 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing system 255 via the network 250.

Each of the computing systems 290 and 291 may include a respective application module 208 and 214. A user may use the computing system 290 and the application module 208 to connect to and communicate with the server computing system 255 and log into application 257 (e.g., a Salesforce.com® application). For some embodiments, a user may use the computing system 290 or 291 for identification verification by the server computing system 255.

Figure 3A:
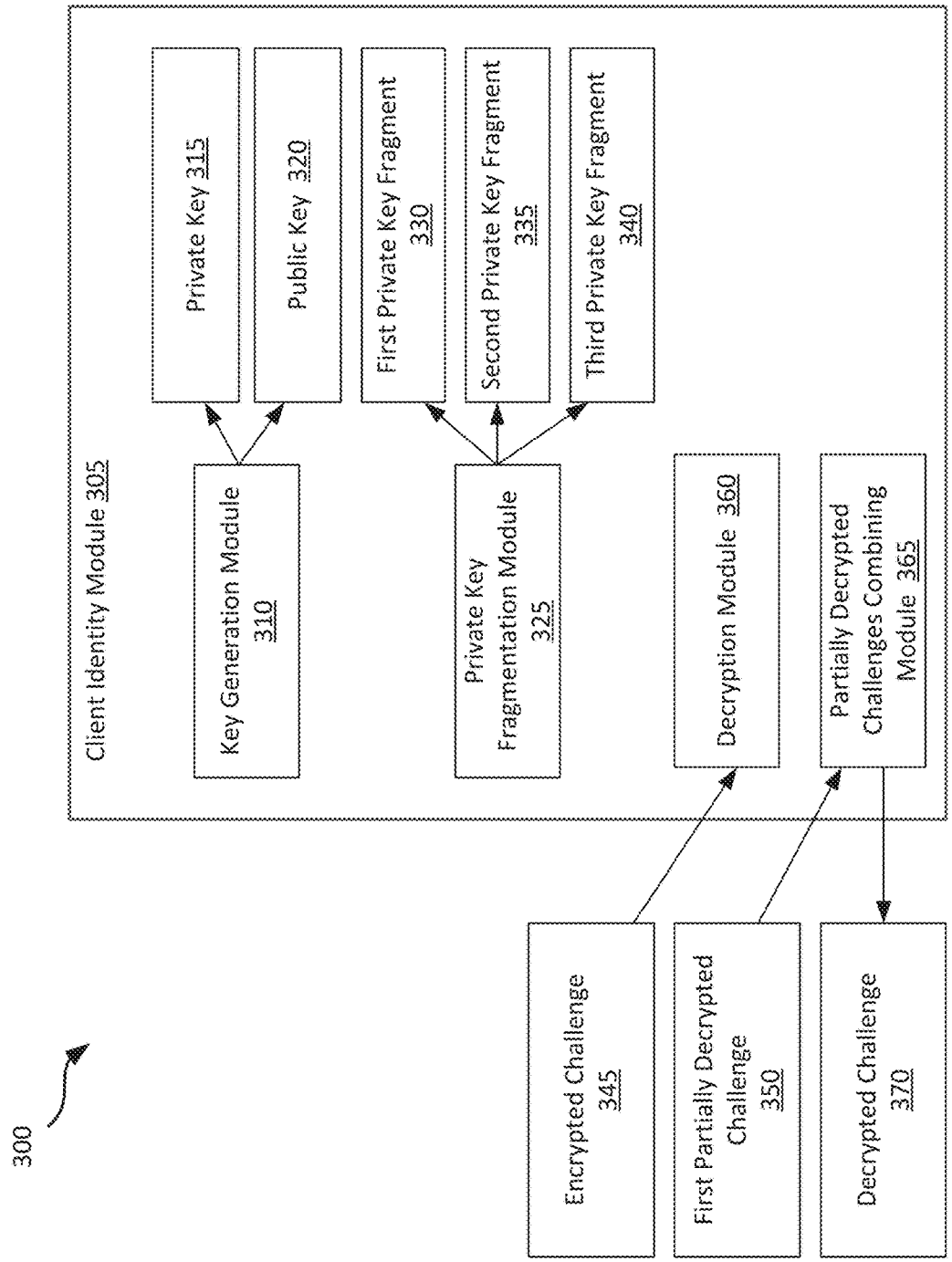
FIG. 3A shows an example of a client identity module that may be used, in accordance with some embodiments.

FIG. 3A shows an example diagram of a client identity module that may be used, in accordance with some embodiments. Diagram 300 includes client identity module 305 configured to generate a decrypted challenge. The client identity module 305 may be associated with a user computing system such as, for example, the computing system 290 (also referred to as a client computing system). The client identity module 305 may include a key generation module 310 configured to generate a private key 315 and a public key 320. The client identity module 305 may include a private key fragmentation module 325 configured to fragment the private key 315 into three private key fragments. In this example, three private key fragments 330, 335 and 340 may be generated. One of the private key fragments, such as the private key fragment 330, and the public key 320 may be transmitted to the server computing system 255.

Referring to the configuration shown in FIG. 3A, the client identity module 305 may include a decryption module 360 configured to receive encrypted challenge 345. For example, the encrypted challenge 345 may be received from the server computing system 255. The decryption module 360 may be configured to partially decrypt the encrypted challenge 345 using the remaining two private key fragments 335 and 340 to generate two partially decrypted challenges.

The client identity module 305 may include a partially decrypted challenges combine module 365 configured to combine the first partially decrypted challenge 350 received from the server computing system 255 and the two partially decrypted challenges generated by the decryption module 360 to generate the decrypted challenge 370. The decrypted challenge 370 may then be transmitted to the server computing system 255 for identity verification.

Figure 3B:
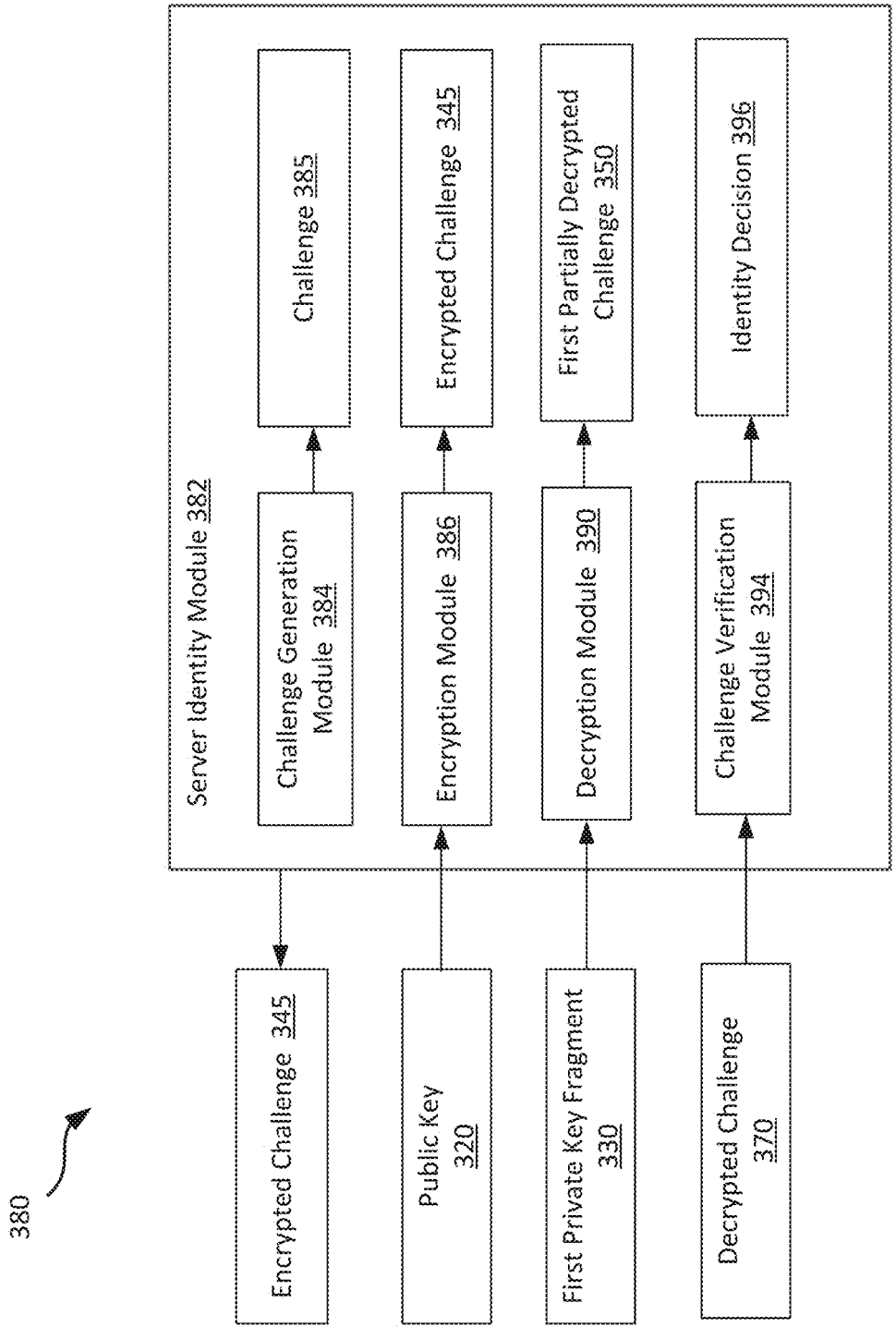
FIG. 3B shows an example of a server identity module that may be used, in accordance with some embodiments.

FIG. 3B shows an example of a server identity module that may be used, in accordance with some embodiments. Diagram 380 includes server identity module 382 configured to perform identity or transaction verification. The server identity module 382 may be associated with a server computing system such as, for example, the server computing system 255. The server identity module 382 may include a challenge generation module 384 configured to generate a challenge 385. The challenge generation module 384 may generate the challenge 385 as a random number.

The server identity module 382 may include an encryption module 386 configured to encrypt the challenge 385 using the public key 320 received from the client computing system 290. This may generate the encrypted challenge 345. The encrypted challenge 345 may be transmitted to a client computing system. The server identity module 382 may include a decryption module 390 configured to apply the first private key fragment 330 to the encrypted challenge 345 to generate a first partially decrypted challenge 350. The first partially decrypted challenge 350 may be transmitted to a client computing system.

The server identity module 382 may include a challenge verification module 394 to compare the challenge 385 with the decrypted challenge 370 received from the client computing system. Based on verifying whether the challenge 385 matches with the decrypted challenge 370, a decision is generated by the identity decision module 396. A notice may be generated and transmitted to the client computing system to indicate whether the transaction is confirmed or denied.

Figure 3C:
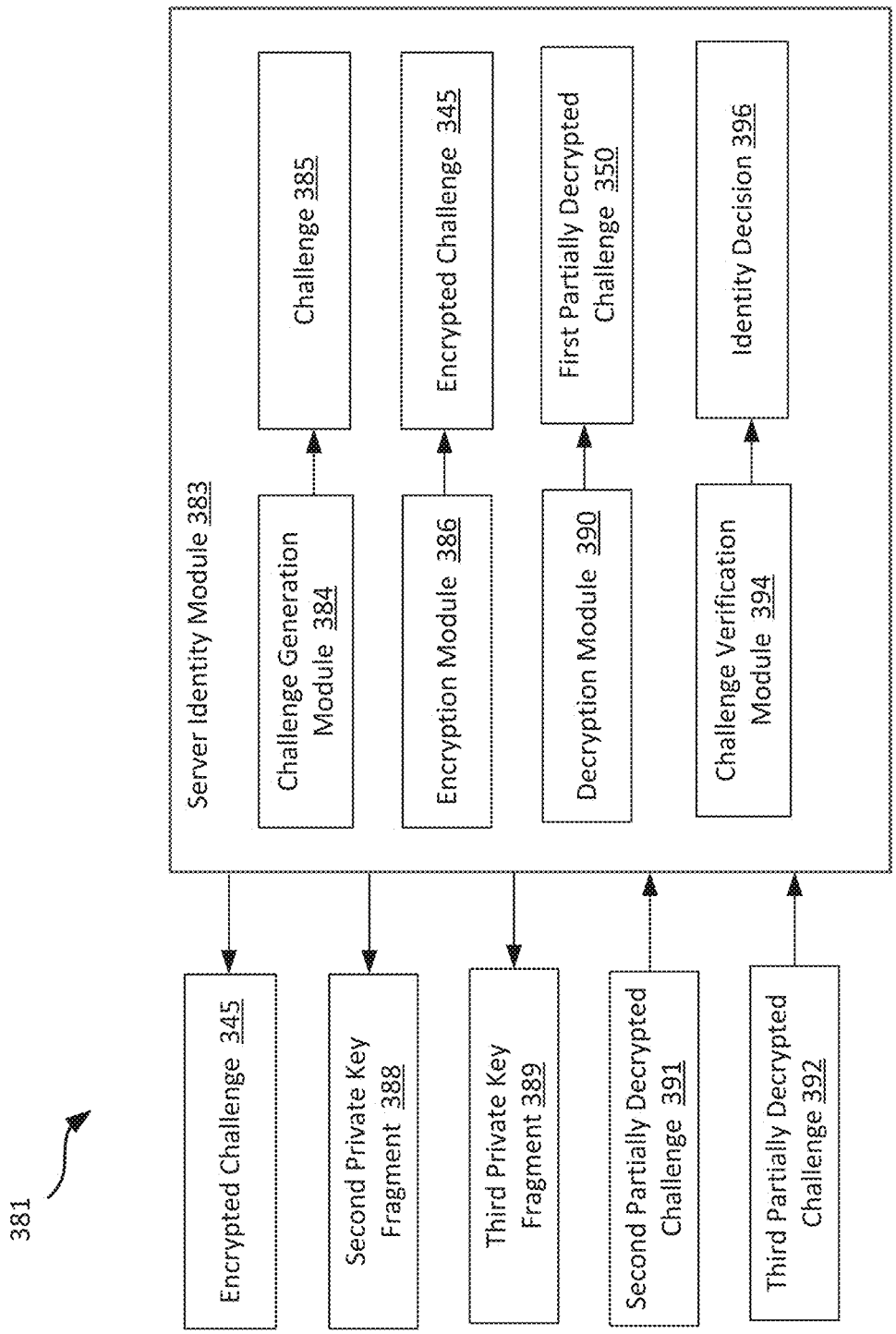
FIG. 3C shows another example of a server identity module that may be used, in accordance with some embodiments.

FIG. 3C shows an alternative example of a server identity module that may be used, in accordance with some embodiments. Diagram 381 includes server identity module 383 configured to perform identity or transaction verification. The server identity module 383 may be associated with a server computing system such as, for example, the server computing system 255. The server identity module 383 may be partially similar to the server identity module 382 of FIG. 3B, except that the generation of the private key 315 and the public key 320 may be performed by the server computing system 255 (e.g., by a module similar to the key generation module 310). For example, having the server computing system 255 performing the key generation may be preferable when the key generation operation cannot be trusted on a client computing system. When the private key 315 and the public key 320 are generated by the server computing system 255, the private key 315 may be fragmented into three fragments by the server computing system (e.g., by a module similar to the private key fragmentation module 325). The public key 320 and the first key fragment 330 may be stored at a storage device associated with the server computing system 255. The second and third private key fragments 388 and 389 may be transmitted to the client computing system. For example, the generating of the public and private keys and the transmission of the second and third private key fragments 388 and 389 from the server computing system 255 to the client computing system 290 may be performed at registration of the client computing system 290 with the server computing system 255. The server computing system 255 may also transmit the encrypted challenge 345 to the client computing system. The client computing system may then use the encrypted challenge 345 and the two private key fragments 388 and 389 to generate a second and a third partially decrypted challenges 391 and 392. The partially decrypted challenges 391 and 392 may then be transmitted by the client computing system to the server computing system 255. The server computing system 255 may then use the first partially decrypted challenge 350, the second partially decrypted challenge 391 and the third partially decrypted challenge to generate a decrypted challenge and compare the decrypted challenge with the challenge 385 that the server computing system 255 generates earlier. If there is a match, then the identity verification succeeds. If it doesn't match, then the identity verification fails.

Figure 4:
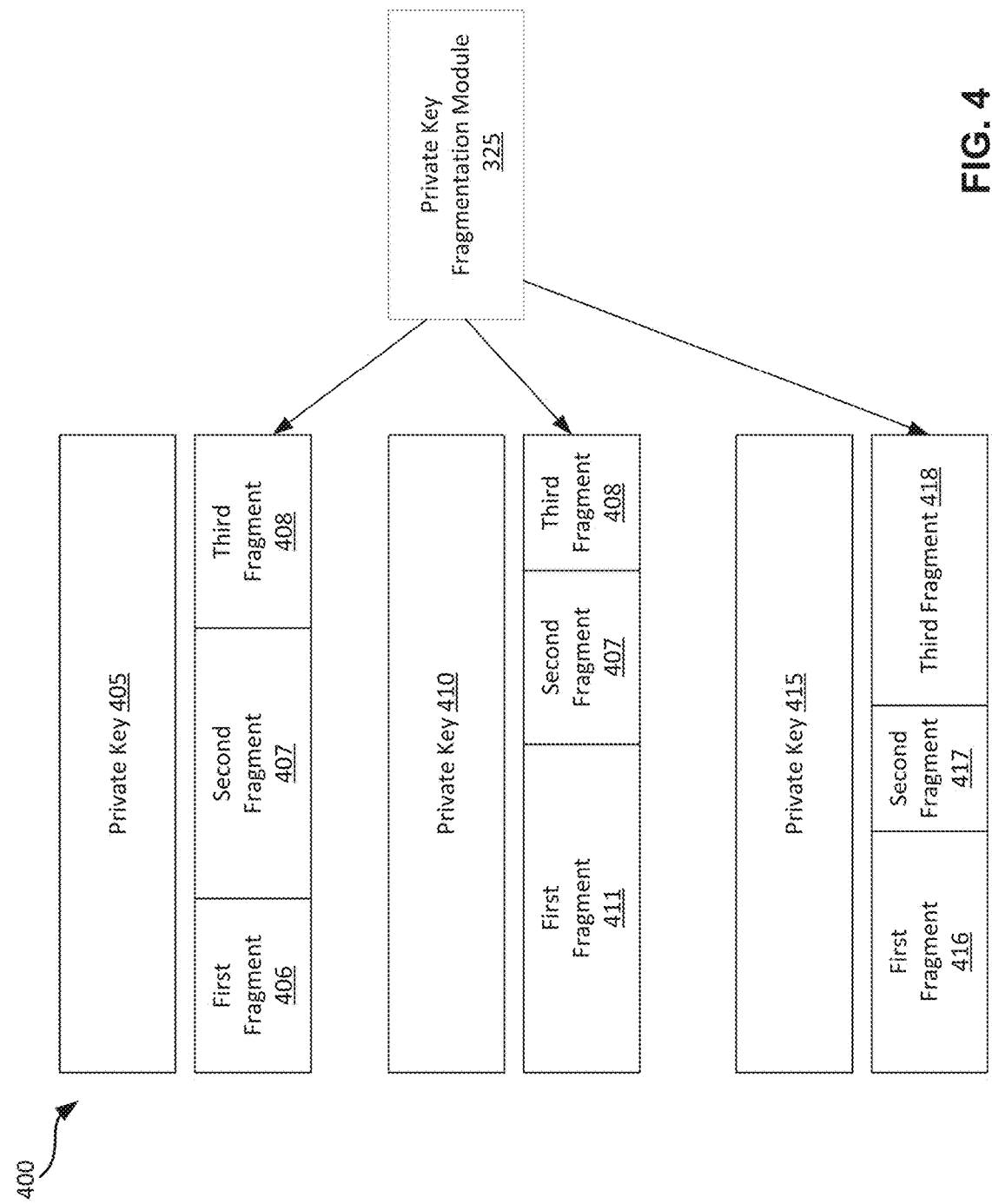
FIG. 4 shows an example of a private key fragmentation module, in accordance with some embodiments.

FIG. 4 shows an example of a private key fragmentation module, in accordance with some embodiments. The private key fragmentation module 325 may be configured to fragment a private key into three private key fragments. For some embodiments, different private keys associated with a computing system may be fragmented differently. In this example, there may be three different private keys 405, 410 and 415 having the same length. The private key 405 may be fragmented into three private key fragments 406, 407 and 408 with its second private key fragment 407 being largest in term of a percentage of the private key 405. The private key 410 may be fragmented into three private key fragments 411, 412 and 413 with its first private key fragment 411 being largest in term of a percentage of the private key 410. The private key 415 may be fragmented into three private key fragments 416, 417 and 418 with its third private key fragment 418 being largest in terms of a percentage of the private key 415. Each of the private keys 405, 410 and 415 may be used to exchange encrypted information with a different computing system. For example, the computing system 290 may associate the private key 405 with the server computing system 255 and the private key 410 with the computing system 291. It may be noted that the term first, second or third private key fragments is used merely to identify the different fragments and is not meant to explicitly specify them in any particular order.

For some embodiments, once a private key is fragmented by the private key fragmentation module 325 into multiple private key fragments, it may not be possible to recreate the private key using the multiple private key fragments because each private key fragment is stored in a different location. For example, a first private key fragment may be transmitted from the computing system 290 to the server computing system 255 along with the associated public key. After the server computing system 255 receives the first private key fragment, the private key and the first private key fragment may no longer exist in the computing system 290. As such, it may be impossible for the hackers to recreate the private key. For some embodiments, when using the implementation shown in FIG. 3C, the client computing system does not have the private key, and the server computing system 255 does not need to receive the first private key fragment from the client computing system.

For some embodiments, when the private key fragmentation module 325 is configured to fragment a private key into three private key fragments, a first private key fragment may be determined by subtracting a randomly selected number from the private key. The remainder may be randomly fragmented to form second and third private key fragments. For some embodiments, when the private key fragmentation module 325 is configured to fragment a private key into two private key fragments, the first private key fragment and the second private key fragment may be formed by randomly fragmenting the private key into two private key fragments. The first private key fragment may be determined by subtracting a random portion from the private key, and the remainder becomes the second private key fragment. A similar approach may be used when there are three private key fragments. Following is an example formula that may be used to fragment a private key into two private key fragments:

BigInteger FragmentOne=(RAN<1.0)×Private_Exponent;

BigInteger FragmentTwo=Private_Exponent.subtract (FragmentOne).

For some embodiments, a partially decrypted challenge may be generated using the following formula:

Partially Decrypted Challenge=Encrypted Challenge, modPow(Private Key Fragment,Modulus), where "Modulus" is the modulus of the public key and private key pair (shown in FIG. 3). In the current example, there are three partially decrypted data 425, 426 and 427 based on the respective first, second and third private key fragment.

For some embodiments, a decrypted challenge may be generated using the following formula:

Decrypted Challenge=$(P1 \times P2 \times P3)$mod Modulus, where P1 is the first partially decrypted challenge based on the first private key fragment, P2 is the second partially decrypted challenge based on the second private key fragment, and P3 is the third partially decrypted challenge based on the third private key fragment.

Figure 5:
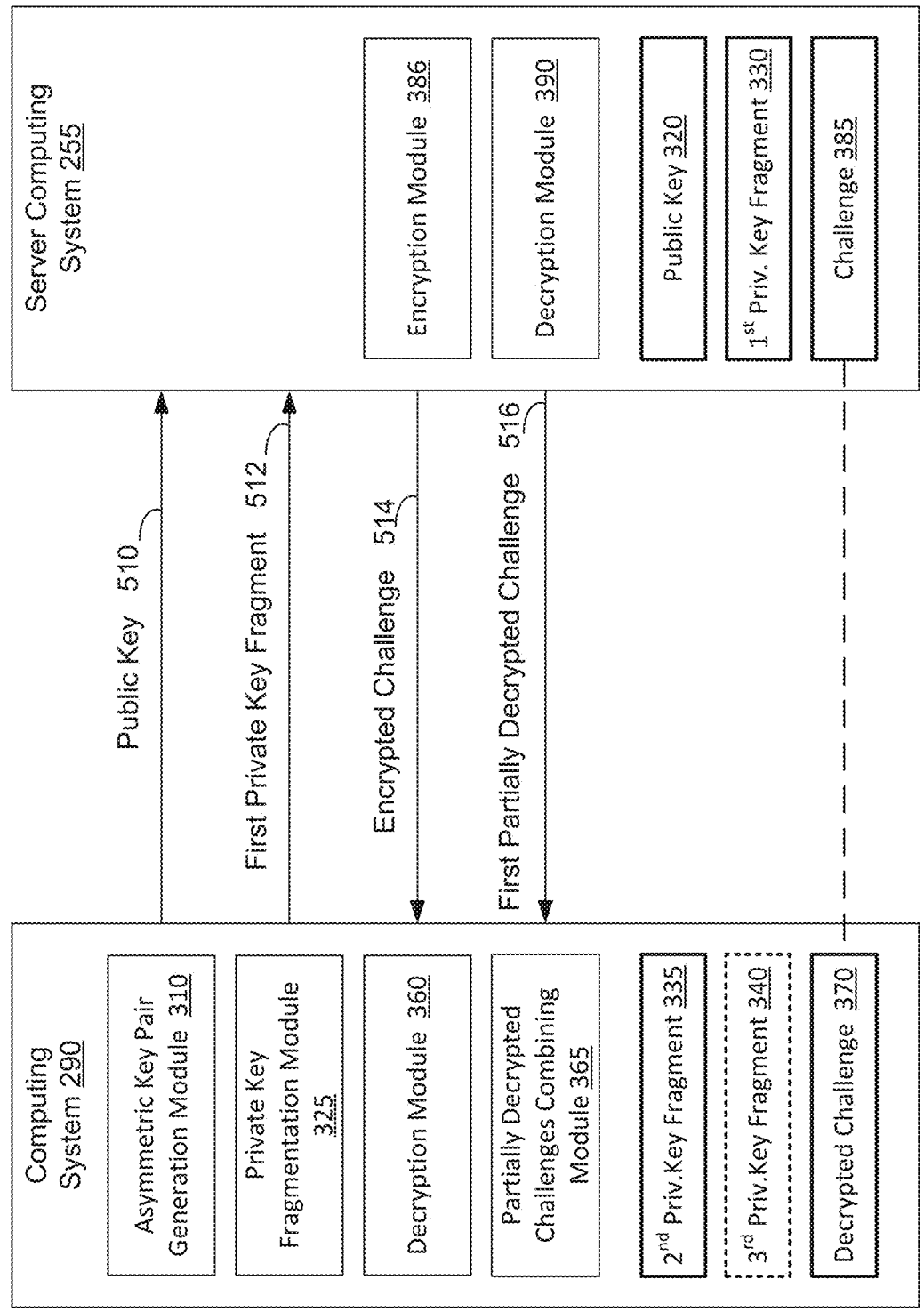
FIG. 5 shows an example communication diagram to securely exchange information between two computing systems, in accordance with some embodiments.

FIG. 5 shows an example communication diagram to securely exchange information between two computing systems, in accordance with some embodiments. In this example, the information is referred to as the challenge 385 (shown in highlighted block), and it is to be transmitted from the server computing system 255 to the computing system 290. The directional arrows between the two computing systems 255 and 290 are used to represent the direction or path of information transmission. The computing system 290 may include a key generation module 310 configured to generate an asymmetric encryption key pair which includes a private key and a public key. The public key may be transmitted to the server computing system 255 (shown as path 510) and stored by the server computing system 255 in an associated storage device as public key 320 (shown in highlighted block). The computing system 290 may include a private key fragmentation module 325 configured to fragment the private key of the asymmetric key pair into three private key fragments. One of the private key fragments (referred to as a first private key fragment) may be transmitted to the server computing system 255 (shown as path 512) and stored in an associated storage device as first private key fragment 330 (shown in highlighted block). One of the remaining two private key fragments may be stored by the computing system 290 in an associated storage device as second private key fragment 335. A third private key fragment 340 (shown in dotted lines) may be remembered by a user of the computing system 290 and provided to the computing system 290 by the user when required.

Although not shown, the server computing system 255 may include logic to recognize that the public key 320 and the first private key fragment 330 are associated with the computing system 290. The server computing system 255 may include an encryption module 386 configured to encrypt the challenge 385 using the public key 320 to generate an encrypted challenge. The encrypted challenge may then be transmitted to the computing system 290 (shown as path 514). The server computing system 255 may include a decryption module 390 configured to use the first private key fragment 330 to partially decrypt the encrypted challenge to generate a first partially decrypted challenge. The first partially decrypted challenge may then be transmitted to the computing system 290 (shown as path 516).

The computing system 290 may include a decryption module 360 configured to partially decrypt the encrypted challenge received from the server computing system 255 using the second private key fragment 335 and the third private key fragment 340. This generates a second partially decrypted challenge and a third partially decrypted challenge. The computing system 290 also includes a partially decrypted challenge combining module 365 configured to combine the first, second and third partially decrypted challenges to generate decrypted challenge 370. A dotted line connecting the challenge 385 and the decrypted challenge 370 is used to show that the two challenges may be the same after the decryption process performed by the computing system 290 is completed.

Figure 6:
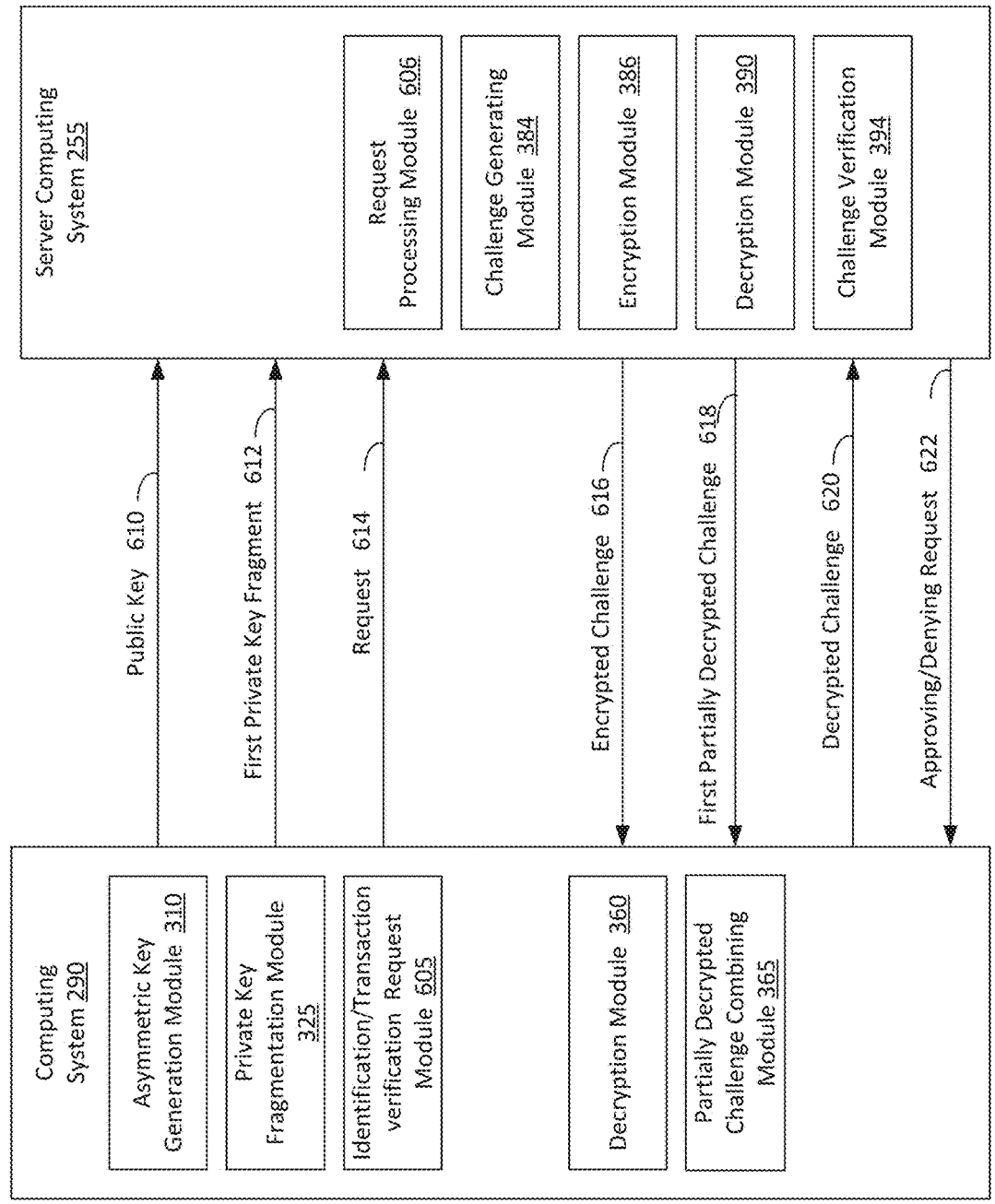
FIG. 6 shows an example communication diagram to initiate a verification request using private key fragments, in accordance with some embodiments.

FIG. 6 shows an example communication diagram to initiate identity verification using private key fragments, in accordance with some embodiments. The diagram of FIG. 6 is similar to the diagram of FIG. 5 with the addition of the identity verification request and the challenge verification operations. In this example, an identity verification request may be initiated using the client computing system 290. The directional arrows between the client computing system 290 and the server computing system 255 are used to represent the direction or path of information transmission. The computing system 290 may include a key generation module 310 configured to generate an asymmetric encryption key pair which includes a private key and a public key. The public key may be transmitted to the server computing system 255 (shown as path 610) and may be saved by the server computing system 255 in an associated storage device, similar to FIG. 5.

The computing system 290 may include a private key fragmentation module 325 configured to fragment the private key of the asymmetric key pair into three private key fragments. One of the private key fragments (referred to as a first private key fragment) may be transmitted to the server computing system 255 (shown as path 612) and stored in an associated storage device as first private key fragment. One of the remaining two private key fragments may be stored by the computing system 290 in an associated storage device as second private key fragment. The third private key fragment may be remembered by a user of the computing system 290 and may be provided by the user as necessary. Although not shown, the server computing system 255 may include logic to recognize that the public key and the first private key fragment are associated with the computing system 290. The computing system 290 may include an identity or transaction verification request module 605 configured to generate an identity or transaction verification request. The identity or transaction verification request may then be transmitted to the server computing system 255 (shown as path 614). For example, the identity or transaction verification request may indicate that it is a request based on challenge verification.

The server computing system 255 may include a request processing module 606, a challenge generating module 384, an encryption module 386, a decryption module 390, and a challenge verification module 394. The request processing module 606 may be configured to associate the previously received public key and the first private key fragment with the identification or transaction verification request. The request processing module 606 may be configured to cause the challenge generating module 384 to generate a challenge. For some embodiments, the challenge may be based on a random number generator. The encryption module 386 may be configured to encrypt the challenge using the public key to generate an encrypted challenge. The encrypted challenge may then be transmitted to the computing system 290 (shown as path 616). The decryption module 390 may be configured to partially decrypt the encrypted challenge using the first private key fragment to generate a first partially decrypted challenge. The first partially decrypted challenge may then be transmitted to the computing system 290 (shown as path 618).

The computing system 290 may include a decryption module 360 configured to partially decrypt the encrypted challenge received from the server computing system 255. In this example, the decryption module 360 may generate a second partially decrypted challenge using a second private key fragment (stored in the computing system 290) and a third partially decrypted challenge using a third private key fragment (provided by the user of the computing system 290), similar to FIG. 5. The computing system 290 may include a partially decrypted challenge combining module 365 configured to combine the first, second and third partially decrypted challenge to generate a decrypted challenge. The decrypted challenge may then be transmitted to the server computing system 255 (shown as path 620).

The challenge verification module 394 may be configured to perform a comparison of the decrypted challenge and the challenge generated by the challenge generating module 384. If none of the private key fragments has been compromised, it may be expected that the decrypted challenge is the same as the challenge. If they are the same, the request may be approved; otherwise, the request may be denied. The approval or denial may be transmitted to the computing system 290 (shown as path 622).

Figure 7A:
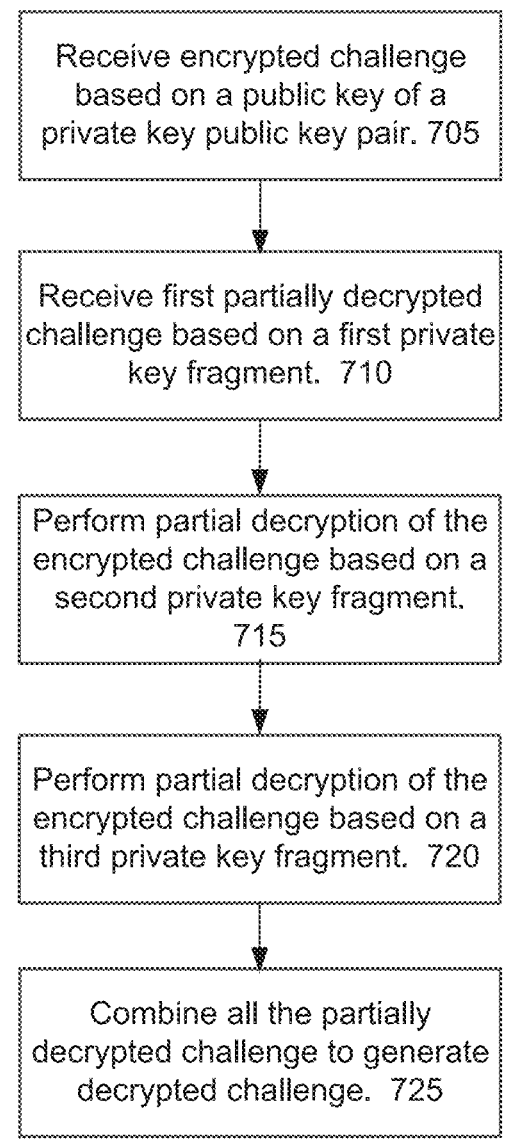
FIG. 7A shows a flowchart of an example process for transmitting secured information using private key fragments, in accordance with some embodiments.

FIG. 7A shows a flowchart of an example process for transmitting secured information using private key fragments, in accordance with some embodiments. The process 700 may be performed by a client computing system configured to receive the secured information. A public key and a first private key fragment may have previously been transmitted to a computing system configured to transmit the secured information. The secured information in this example is referred to as a challenge.

The process 700 may start at block 705 where an encrypted challenge is received. A public key is used to generate the encrypted challenge. At block 710, a first partially decrypted challenge is received. The first partially decrypted challenge may be generated by decrypting the encrypted challenge using a first private key fragment.

At block 715, second partially decrypted challenge is generated. This is based on using a second private key fragment stored in the computing system configured to receive the secured challenge. At block 720, a third partially decrypted challenge is generated. This is based on using a third private key fragment provided by a user of the computing system configured to receive the secure challenge. At block 725, the first, second and third partially decrypted challenges may be combined to generate the decrypted challenge.

Figure 7B:
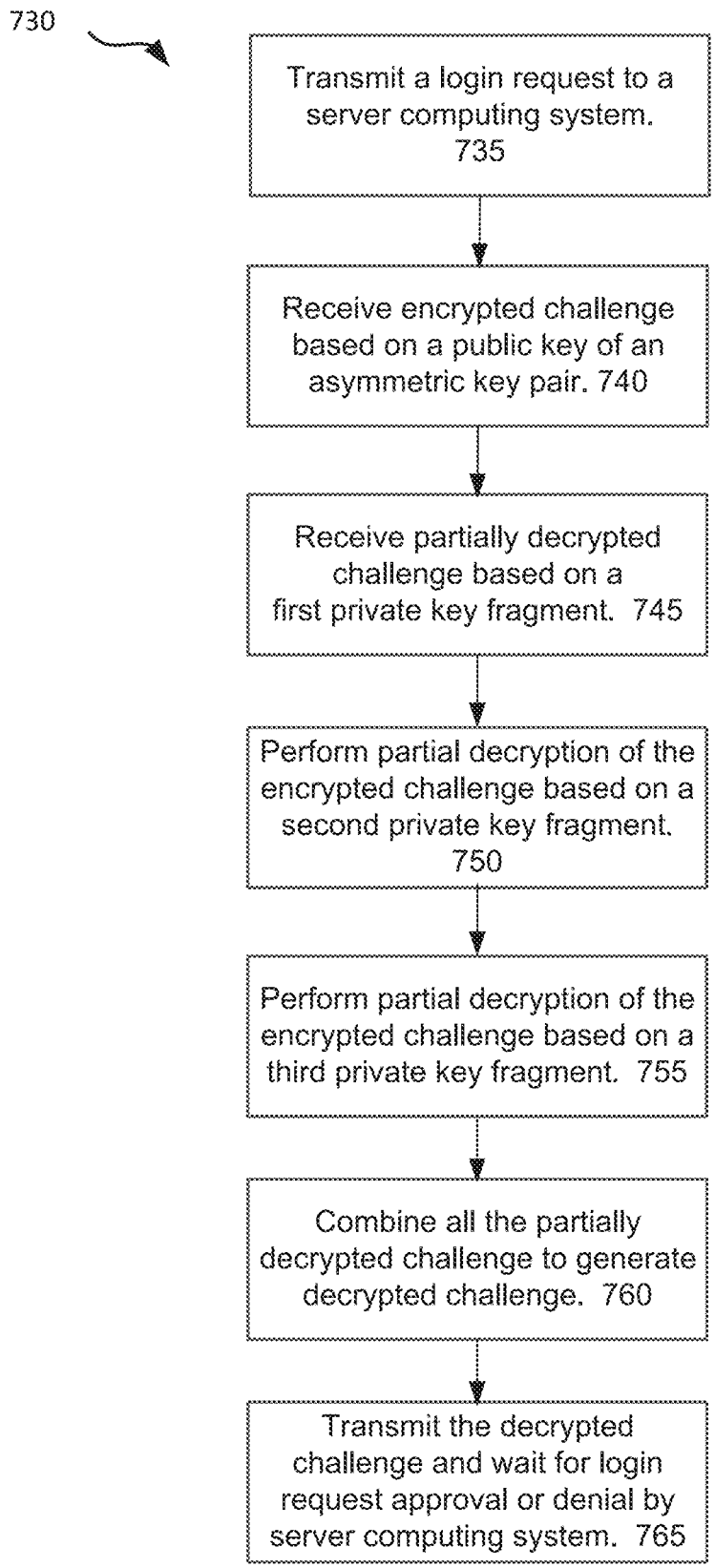
FIG. 7B shows a flowchart of an example identity verification process that may be performed by a client computing system, in accordance with some embodiments.

FIG. 7B shows a flowchart of an example identity verification process that may be performed by a client computing system, in accordance with some embodiments. The process 730 may be performed by a computing system configured to enable a user to do identity verification with a server computing system. An asymmetric key pair may be used. A public key and a first private key fragment may have previously been transmitted to the server computing system.

The process 730 may start at block 735 where a request may be transmitted to the server computing system. At block 740, an encrypted challenge may be received from the server computing system. The encrypted challenge may be encrypted using the public key. At block 745, first partially decrypted challenge may be received. The first partially decrypted challenge may be generated by decrypting the encrypted challenge using the first private key fragment.

At block 750, a second partially decrypted challenge may be generated. This is based on using a second private key fragment. At block 755, third partially decrypted challenge may be generated. This is based on using a third private key fragment. At block 760, the first, second and third partially decrypted challenges may be combined to generate the decrypted challenge. At block 765, the decrypted challenge may be transmitted to the server computing system for verification. If the server computing system confirms that the decrypted challenge is as expected, a notification of a successful transaction may be received; otherwise, a notification of a failed transaction may be received.

Figure 7C:
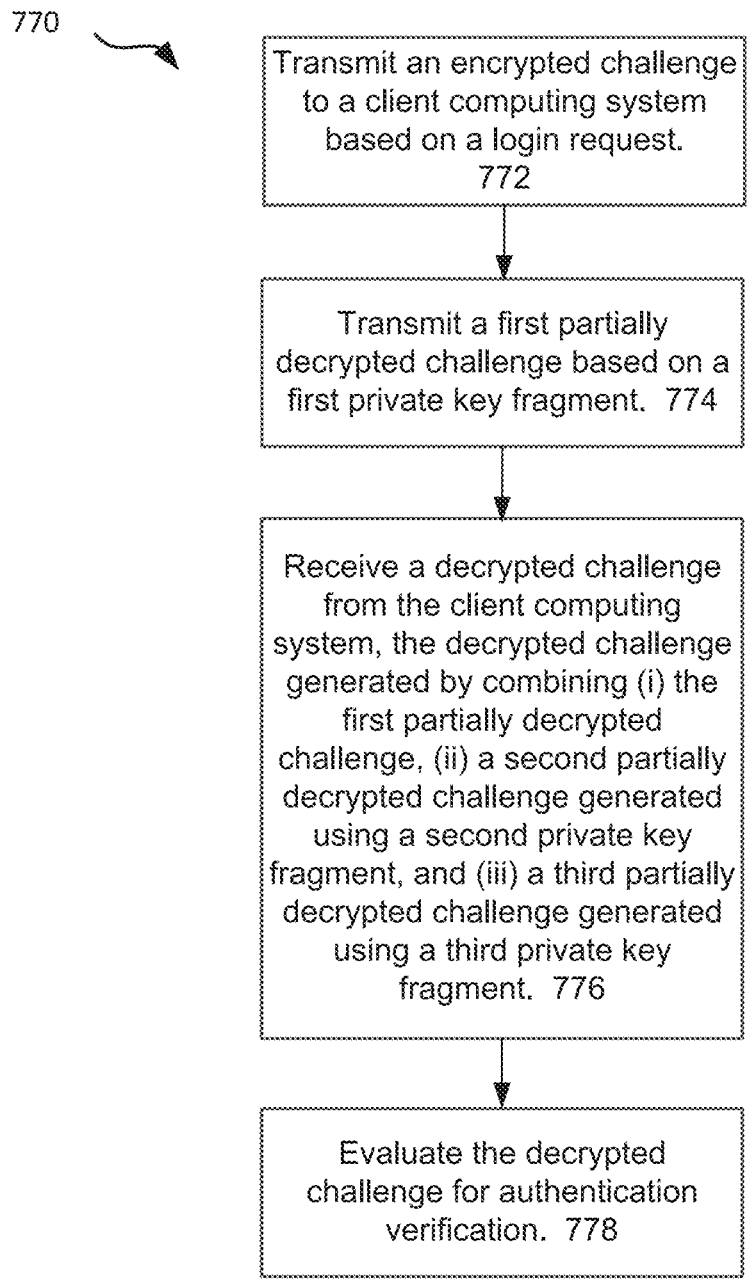
FIG. 7C shows a flowchart of an example identity verification process that may be performed by a server computing system, in accordance with some embodiments.

FIG. 7C shows a flowchart of an example identity verification process that may be performed by a server computing system, in accordance with some embodiments. The process 770 may be performed by a server computing system configured to verify identity of a user using a client computing system. The process 770 may correspond to the process 730 of FIG. 7B.

The process 770 may start at block 772 where an encrypted challenge may be transmitted to the client computing system. At block 774, a first partially decrypted challenge may be transmitted to the client computing system. At block 776, a decrypted challenge may be received from the client computing system. The decrypted challenge may be generated by the client computing system using the first partially decrypted challenge, a second partially decrypted challenge and a third partially decrypted challenge. The second partially decrypted challenge is generated by applying a second private key fragment to the encrypted challenge. The third partially decrypted challenge is generated by applying a third private key fragment to the encrypted challenge. At block 778, the decrypted challenge may be evaluated for identity verification request by the client computing system. The evaluation may be based on a comparison of the decrypted challenge and a challenge used to generate the encrypted challenge. Based on the comparison, a notification of a successful verification may be transmitted to the client computing system.

Figure 8A:
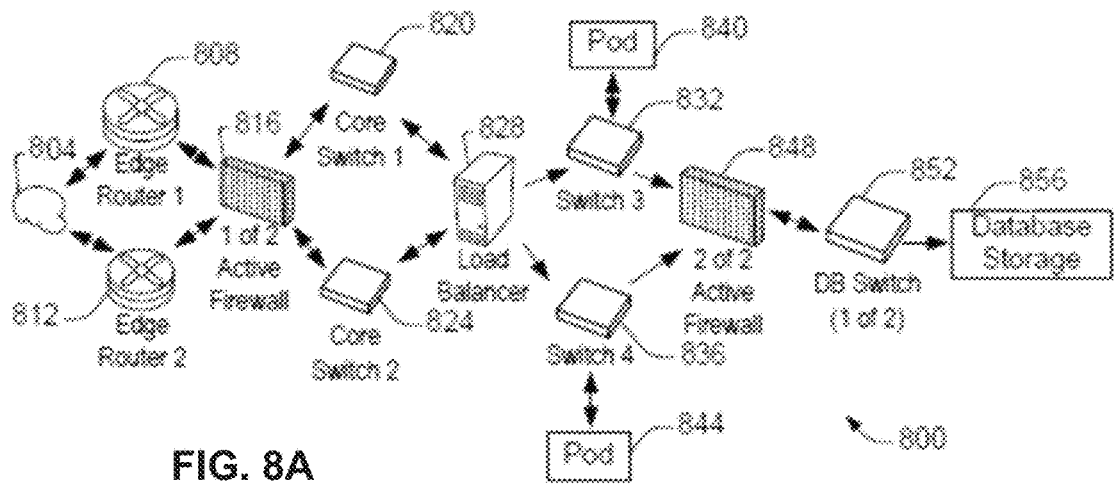
FIG. 8A shows a system diagram illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
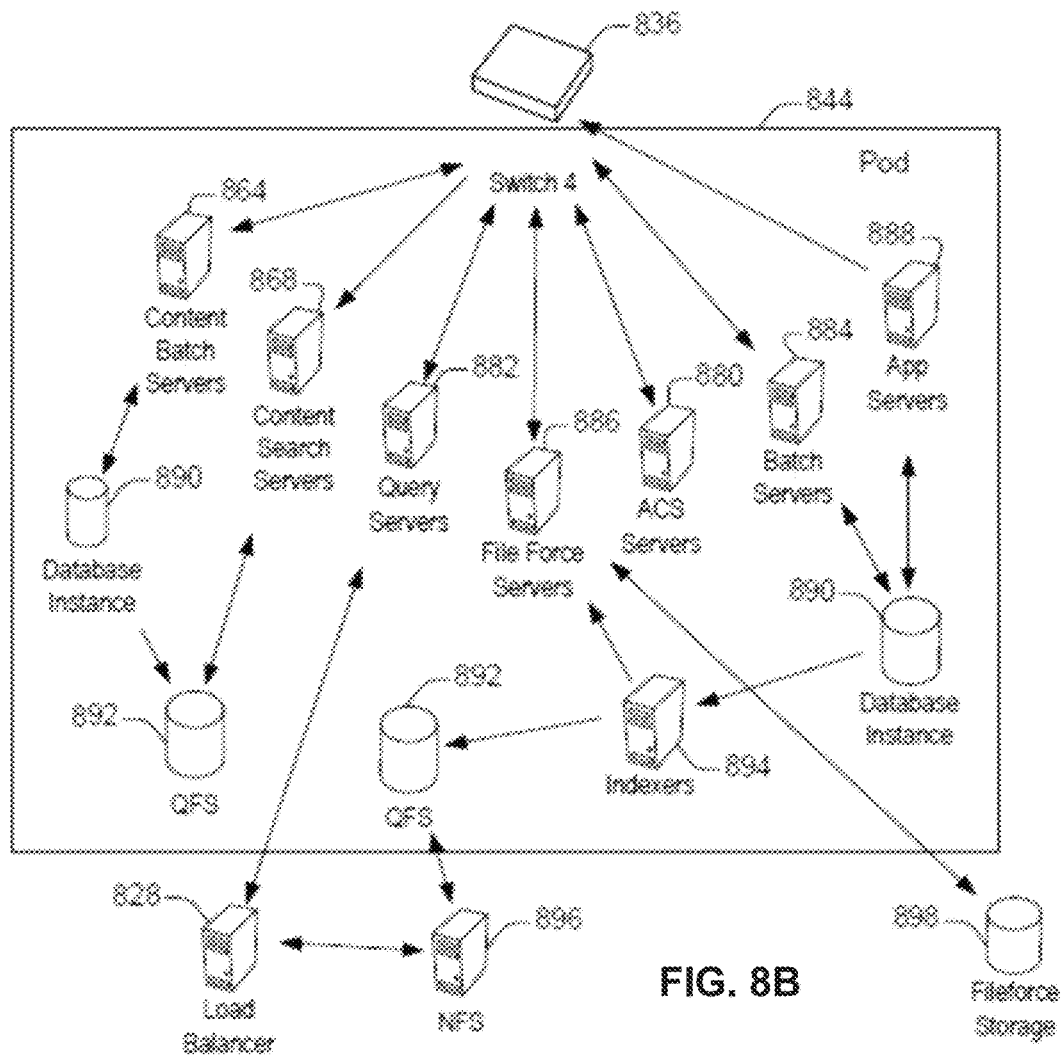
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router.

The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. For some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
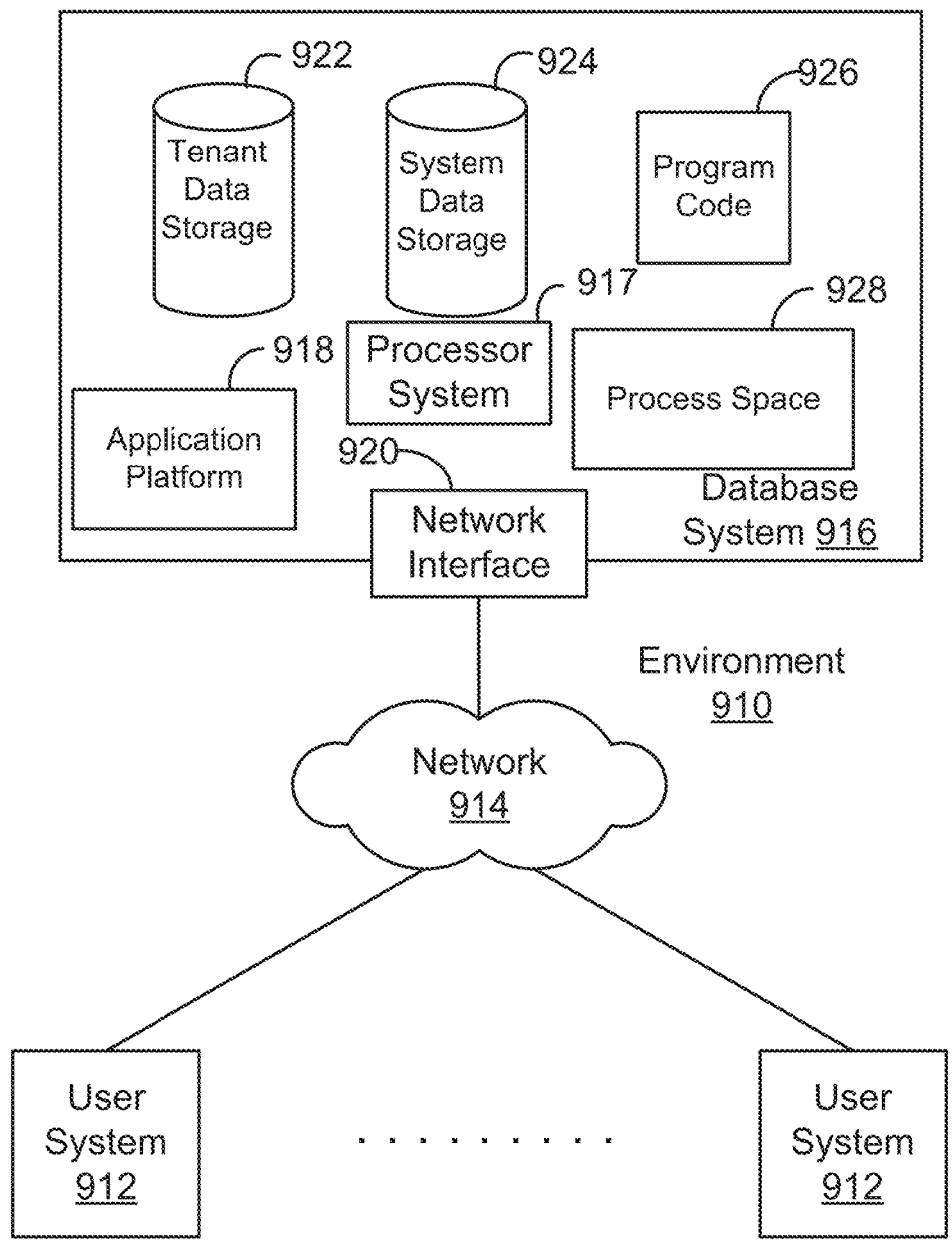
FIG. 9 shows a system diagram illustrating the architecture of a multi-tenant database environment, in accordance with some embodiments.
Figure 10:
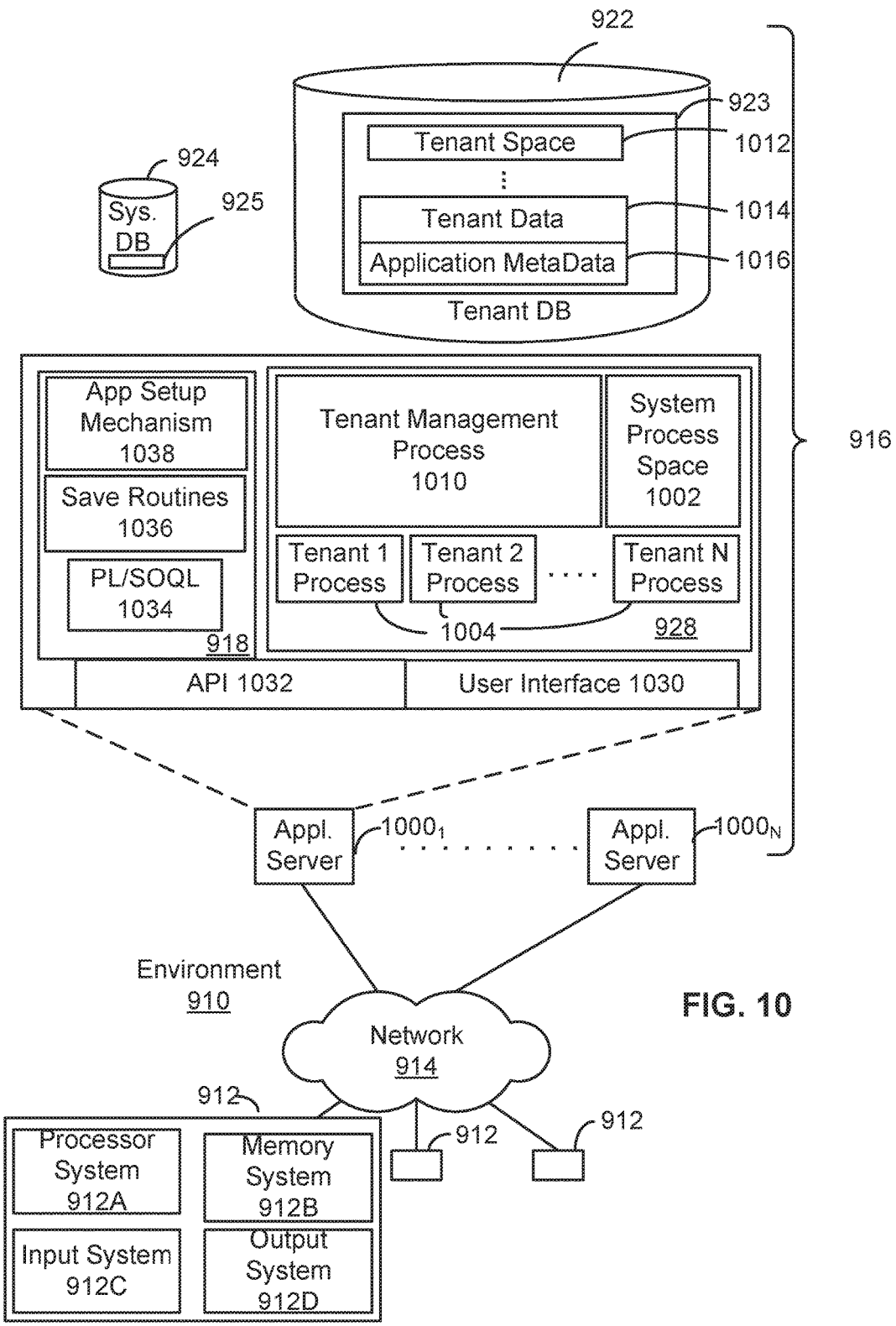
FIG. 10 shows a system diagram further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 4007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-generated method for identity verification, the method comprising:

transmitting, by a server computing system to a client computing system, an encrypted challenge generated using a public key of an asymmetric key pair;

transmitting, by the server computing system to the client computing system, a first partially decrypted challenge generated by applying a first private key fragment of a private key of the asymmetric key pair to the encrypted challenge;

receiving, by the server computing system from the client computing system, a decrypted challenge, the decrypted challenge generated by:

(i) applying a second private key fragment of the private key to the encrypted challenge to generate a second partially decrypted challenge, the second private key fragment stored in the client computing system, (ii) applying a third private key fragment of the private key to the encrypted challenge to generate a third partially decrypted challenge, the third private key fragment provided by a user of the client computing system, and (iii) combining the first partially decrypted challenge, the second partially decrypted challenge and the third partially decrypted challenge to generate the decrypted challenge; and comparing, by the server computing system, the decrypted challenge with a challenge used to encrypt the encrypted challenge to verify identity.

2. The method of claim 1, further comprising receiving, by the server computing system from the client computing system, the public key and the first private key fragment.

3. The method of claim 2, wherein the challenge is generated by the server computing system using a random number generator.

4. The method of claim 3, further comprising transmitting, by the server computing system to the client computing system, a notification of a successful identity verification based on confirming that the decrypted challenge is the same as the challenge.

5. The method of claim 4, wherein the private key is fragmented into the first private key fragment, the second private key fragment, and the third private key fragment by the client computing system.

6. The method of claim 5, further comprising receiving, by the server computing system from the client computing system, a request for identity verification.

7. A system comprising:
one or more processors; and
a non-transitory computer readable medium storing a plurality of instructions, which
when executed, cause the one or more processors to:
transmit an encrypted challenge generated using a public key of an asymmetric key pair;
transmit a first partially decrypted challenge generated by applying a first private key fragment of a private key of the asymmetric key pair to the encrypted challenge; and
receiving a decrypted challenge, the decrypted challenge generated by:
(i) applying a second private key fragment of the private key to the encrypted challenge to generate a second partially decrypted challenge, the second private key fragment stored in a client computing system,
(ii) applying a third private key fragment of the private key to the encrypted challenge to generate a third partially decrypted challenge, the third private key fragment provided by a user of the client computing system, and
(iii) combining the first partially decrypted challenge, the second partially decrypted challenge and the third partially decrypted challenge to generate the decrypted challenge; and
compare the decrypted challenge with a challenge used to encrypt the encrypted challenge to verify identity.

8. The system of claim 7, further comprising instructions which when executed, cause the one or more processors to receive the public key and the first private key fragment.

9. The system of claim 8, wherein the challenge is generated using a random number generator.

10. The apparatus of claim 9, further comprising instructions which when executed, cause the one or more processors to transmit a notification of successful verification based on confirming that the decrypted challenge is the same as the challenge.

11. The apparatus of claim 10, wherein the private key is fragmented into the first private key fragment, the second private key fragment, and the third private key fragment by the client computing system.

12. The apparatus of claim 11, further comprising instructions which when executed, cause the one or more processors to receive a verification request from the client computing system.

13. A computer program product comprising computer-readable program code to be executed by one or more processors when retrieved from a non-transitory computer-readable medium, the program code including instructions to:
transmit an encrypted challenge generated using a public key of an asymmetric key pair;
transmit a first partially decrypted challenge generated by applying a first private key fragment of a private key of the asymmetric key pair to the encrypted challenge; and
receive a decrypted challenge, the decrypted challenge generated by:
(i) applying a second private key fragment of the private key to the encrypted challenge to generate a second partially decrypted challenge, the second private key fragment stored in a client computing system;
(ii) applying a third private key fragment of the private key to the encrypted challenge to generate a third partially decrypted challenge, the third private key fragment provided by a user of the client computing system; and
(iii) combining the first partially decrypted challenge, the second partially decrypted challenge and the third partially decrypted challenge to generate the decrypted challenge; and
compare the decrypted challenge with a challenge used to encrypt the encrypted challenge to verify identity.

14. The computer program product of claim 13, wherein the program code includes further instructions to receive the public key and the first private key fragment.

15. The computer program product of claim 14, wherein the challenge is generated using a random number generator.

16. The computer program product of claim 15, wherein the program code includes further instructions to transmit a notification of successful verification based on confirming that the decrypted challenge is the same as the challenge.

17. The computer program product of claim 16, wherein the private key is fragmented into the first private key fragment, the second private key fragment, and the third private key fragment by the client computing system.

18. The computer program product of claim 17, wherein the program code includes further instructions to receive a verification request from the client computing system.

* * * * *